United States Patent [19]

Cuisia et al.

[11] Patent Number: 4,980,128
[45] Date of Patent: Dec. 25, 1990

[54] CONTROL OF CORROSION IN AQUEOUS SYSTEMS

[75] Inventors: Dionisio G. Cuisia, Chicago; Chih M. Hwa, Palatine; Murrell L. Salutsky, Highland Park, all of Ill.

[73] Assignee: W. R. Grace & Co.-Conn., New York, N.Y.

[21] Appl. No.: 26,494

[22] Filed: Mar. 16, 1987

[51] Int. Cl.$^5$ ............................................. C23F 11/04
[52] U.S. Cl. ...................................... 422/16; 210/750; 252/188.28; 252/390; 252/392
[58] Field of Search ...................... 422/16; 252/188.28; 252/390, 392; 210/750

[56] References Cited

U.S. PATENT DOCUMENTS

| | | |
|---|---|---|
| 2,170,596 | 8/1939 | Quiggle . |
| 3,551,349 | 12/1970 | Kallfass . |
| 3,843,547 | 10/1974 | Kaufman et al. . |
| 3,917,700 | 11/1975 | Auerbach . |
| 3,983,048 | 9/1976 | Schiessl et al. . |
| 4,026,664 | 5/1977 | Noack . |
| 4,067,690 | 1/1978 | Cuisia et al. . |
| 4,079,018 | 3/1978 | Noack . |
| 4,269,717 | 5/1981 | Slovinsky . |
| 4,278,635 | 7/1981 | Kerst . |
| 4,279,767 | 7/1981 | Muccitelli . |
| 4,289,645 | 9/1981 | Muccitelli . |
| 4,350,606 | 9/1982 | Cuisia et al. . |
| 4,399,098 | 8/1983 | Cuisia et al. . |
| 4,479,917 | 10/1984 | Rothgery et al. . |
| 4,487,708 | 12/1984 | Muccitelli . |
| 4,487,745 | 12/1984 | Weiss et al. . |
| 4,596,874 | 6/1986 | Murahashi . |
| 4,670,131 | 6/1987 | Ferrell ................................. 252/8.3 |

FOREIGN PATENT DOCUMENTS

| | | |
|---|---|---|
| 0054345 | 6/1987 | European Pat. Off. . |
| 57-204288 | 12/1982 | Japan . |
| 2157670A | 10/1985 | United Kingdom . |

OTHER PUBLICATIONS

CA 102 (14): 119389, Chem. Abstract, 1984.
Chemical Abstracts, vol. 93 1980 p. 542, entry 93:103600v; Nemchaninova et al. "Mechanism of the Protective Action of Nitrone on the Corrosion of Steel in Hydrochloric Acid".
Houben–Weyl: "Methoden der Organischen Chemie"; (4th ed. part X/4: Stickstoff-Verbindungen I (1968) p. 440.
Encyclopedia of Chemical Technology, vol. 9 (1952), "Oximes" pp. 688–698.
Encyclopedia of Chemical Technology, 2nd Ed. (1966), vol. 11; "Hydroxylamine and Hydroxylamine Salts", pp. 493–501.
D. H. Johnson et al., "The Autoxidation of Aliphatic Hydroxylamines" Chemistry and Industry (1953); pp. 1032–1033.
D. H. Johnson et al., "Aliphatic Hydroxylamines, Part II, Autoxidation", Journal of the Chemical Society, 1956, Part I, pp. 1092–1103.
T. Caceres et al., "Autoxidation of Diethyl Hydroxylamine"; International Journal of Chemical Kinetics (1978) pp. 1167–1182.
Pennwalt Organotopics, vol. 1, No. 3, pp. 1–4 Organic Chemical Newsletter from Pennwalt, 1985; distributed in Chemical & Engineering News, vol. 64, No. 13.
Shaffer et al., "Oxidation of Diethylhydroxylamine in Water Solution at 25°–80° C."; J. Phys. Chem. 1986, 90, 4408–4413; 1986 American Chemical Society.

Primary Examiner—Robert J. Warden
Assistant Examiner—Timothy M. McMahon
Attorney, Agent, or Firm—James P. Barr

[57] ABSTRACT

Corrosion of metals in contact with system water in an aqueous system is inhibited by adding to the system water an effective amount of an oxygen scavenger selected from the group of nitrones having the formula:

$$\begin{array}{c} R_1 \\ \phantom{R_1}\diagdown \\ \phantom{R_1R_2}C=\overset{+}{N} \\ \phantom{R_1}\diagup \phantom{R_1R_2}\diagdown \\ R_2 \phantom{R_1R_2R_3} R_3 \end{array} \;\;\; O^-$$

wherein $R_1$ and $R_2$ may be the same or different and are each a member selected from the group consisting of hydrogen and hydrocarbon radicals having between 1 and 10 carbon atoms, and $R_3$ is a hydrocarbon radical having between 1 and 10 carbon atoms; or water soluble salts thereof.

32 Claims, 1 Drawing Sheet

CONTROL OF CORROSION IN AQUEOUS SYSTEMS

FIELD OF INVENTION

This invention relates to the addition of oxygen scavengers to aqueous systems to reduce the corrosion of metals that are in contact with water in the systems, and more particularly, to the addition of a composition comprising a nitrone or certain related compounds to the system water of an aqueous system as an oxygen scavenger to reduce corrosion of metal surfaces in contact with the system water.

BACKGROUND OF THE INVENTION

In processes using aqueous solutions, corrosion of metal surfaces may occur at various locations including feed lines, heaters, steam lines, process tanks and return lines. Dissolved oxygen in the water can be a principal factor influencing this corrosion, particularly where iron and steel are materials of construction. The corrosion of the iron and steel pipes, boilers, and economizers of conventional boiler systems is a well known problem; and controlling the presence of oxygen in boiler systems, particularly in the feed water section, has received considerable attention. Oxygen removal may be partially accomplished by either vacuum or thermal deaeration, or both. Complete removal of oxygen cannot be effected by these means, however, and further removal by use of a chemical scavenging agent, such as sodium sulfite, has been a customary practice.

In recent times, the use of low pressure boilers (operating below about 150 psig) has been increasingly supplemented by use of boilers operating at moderate pressure (operating between about 150 psig and about 600 psig) and high pressure (operating above about 600 psig). As boiler operating temperatures and pressures have increased there has been particular interest in the performance of oxygen scavengers at these operating conditions. For example, use of sulphites at elevated temperatures and pressures may cause an increase in solids, and formation of sulfur dioxide and hydrogen sulfide, both of which can be a source of corrosion. Scavengers such as hydrazine, hydroquinone, and certain hydroxylamines have been found to perform satisfactorily in some circumstances. In other circumstances, the efficiency with which the scavenging proceeds has not been optimal. There is thus a continuing need for alternative oxygen scavengers which can be effectively used at elevated temperatures and pressures. Of particular value are single scavenging compounds which can be used in place of hydrazine.

Despite the reported toxicity of hydrazine, much recent research has concerned development of corrosion inhibitors using hydrazine together with various organic products. Kallfass U.S. Pat. No. 3,551,349 suggests using hydrazines in combination with activating amounts of various quinone compounds (including hydroxyl forms such as pyrocatechol and hydroquinone) and their derivatives, particularly those with hydrophilic substituents such as carboxylic acid and sulphonic acid. Kaufman et al. U.S. Pat. No. 3,843,547 discloses a hydrazine-hydroxyl quinone combination in further combination with various aryl amine compounds; while Schiessel et al. U.S. Pat. No. 3,983,048 discloses a use of hydrazine along with a catalytic proportion of certain aryl amines, including sulfonated aryl amines. Noack U.S. Pat. Nos. 4,026,664 and 4,079,018 disclose hydrazine-based corrosion inhibitors which use organometallic complexes (including certain amino derivatives of carboxylic acids) as catalysts, and preferably quinone compounds (including hydroquinone) and their derivatives to render the compositions compatible with phosphonate scale control agents.

Other work has focused on nitrogen-containing compounds other than hydrazine such as various amines, hydroxylamines, or oximes. U.S. Pat. No. 4,067,690 of Cuisia et al. discloses that hydroxylamine and certain derivatives thereof are highly effective oxygen scavengers in boiler water. The hydroxylamines may be catalyzed with any of a number of well-known catalysts used in sodium sulfite or hydrazine boiler water treatment. Alakli metal hydroxide, water soluble metal salts, hydroquinone, and benzoquinone are also useful catalysts. As disclosed in Cuisia et al., U.S. Pat. No. 4,350,606 the use of a hydroxylamine compound and a volatile, neutralizing amine such as cyclohexylamine, morpholine, diethylaminoethanol, dimethylpropanolamine, or 2-amino-2-methyl-1-propanol, inhibits corrosion in boiler systems caused by carbon dioxide and oxygen. Japanese Patent Document SHO 57-204288 to Sato discloses using certain hydroxylamines as de-oxidants in combination with certain trivalent phenols, napthoquinones, and anthraquinones or various derivatives thereof, as activating agents. The invention may be practiced in boiler related systems and activity is deemed particularly significant in neutral and alkaline pH ranges. U.K. patent application No. GB 2,157,670A by Nemes et al. reveals advantageous use of hydroxylamines together with neutralizing amines and a quinone, a dihydroxybenzene, a diaminobenzene, or an aminohydroxybenzene compound to scavenge oxygen and to inhibit corrosion in boiler water and other aqueous systems.

Kerst U.S. Pat. No. 4,278,635 discloses use of various dihydroxy, diamino, and amino hydroxy benzenes and their lower alkyl substituted derivatives (including sulfonated napthalenes), and particularly hydroquinone, as deoxygenating corrosion control agents which compare favorably with other scavengers such as hydrazine. Reaction rate increases with higher pH and higher temperature are disclosed, as is use of the invention in boiler systems. Muccitelli, U.S. Pat. Nos. 4,279,767; 4,289,645; and 4,487,708, are directed to use of hydroquinone as an oxygen scavenger in combination with various compatible amines. Addition of hydroquinone to boiler feedwater together with certain neutralizing amines used to neutralize carbon dioxide in the boiler condensate system is disclosed. The systems preferably have elevated temperatures and/or alkaline conditions. European patent Publication No. 0054345 is directed to use of certain aminophenol compounds to reduce oxygen in aqueous medium such as boiler water. These scavengers are deemed to outperform hydrazine in simulated feedwater conditions and are preferably used in alkaline pH.

Weiss et al. U.S. Pat. No. 4,487,745 is directed to the use of certain oximes to remove dissolved oxygen from aqueous systems such as steam generating systems, and to thereby inhibit the corrosion of metal surfaces. Slovinsky U.S. Pat. No. 4,269,717 is directed to similar use of carbohydrazide and discloses that certain scavengers show activity comparable to hydrazine while other similar compounds do not. Cuisia U.S. Pat. No. 4,399,098 discloses use of semicarbazide and its salts as oxygen scavengers in aqueous systems such as boiler water systems to reduce corrosion from dissolved oxygen. Rothgery et al. U.S. Pat. No. 4,479,917 is directed to an oxygen-scavenging, corrosion-inhibiting agent for fluidic systems comprising certain aminoguanidine compounds. Quiggle U.S. Pat. No. 2,170,596 describes oxygen-absorbing solutions using catalysts such as amidol, para amido phenol, and certain amino-anthraquinones together with reducing agents such as sulfides.

It is well known that a nitrone may be prepared by the reaction of a hydroxylamine, particularly a mono N-substituted hydroxylamine, with an aldehyde or a ketone. It is also known that alkylation of oximes using agents such as alkyl halides or sulfates yields nitrones as well as oxime ethers, the relative yield of each depending on the reaction conditions and the nature of the reagents (including the configuration of the oxime). Murahashi et al. U.S. Pat. No. 4,596,874 describes nitrone synthesis by reacting certain secondary amines with a peroxide in the presence of a catalyst.

SUMMARY OF THE INVENTION

We have found that the addition of nitrones or their water soluble salts to the system water of aqueous systems, including boiler and steam condensate systems, inhibits the corrosion of metal in contact with the system water by removing oxygen in the system. The invention herein described surprisingly promotes the rapid scavenging of oxygen in aqueous systems, such as boiler water systems, containing dissolved air and/or oxygen. The invention is especially suited for aqueous systems such as boiler and steam condensate systems wherein the system liquid or steam consists essentially of water and oxygen. Indeed, the efficiency of oxygen scavenging achieved by using the additives, and the effectiveness of the additives at conditions found within boiler systems, makes boiler system use particularly advantageous.

Accordingly, it is an object of this invention to provide a method to inhibit corrosion of metals in contact with aqueous solutions.

It is another object of this invention to remove oxygen from boiler system water.

It is still another object of this invention to remove oxygen from steam and its condensate.

These and other objects and advantages of the present invention will become apparent from the detailed description of the invention which follows.

DETAILED DESCRIPTION

Figure 1:
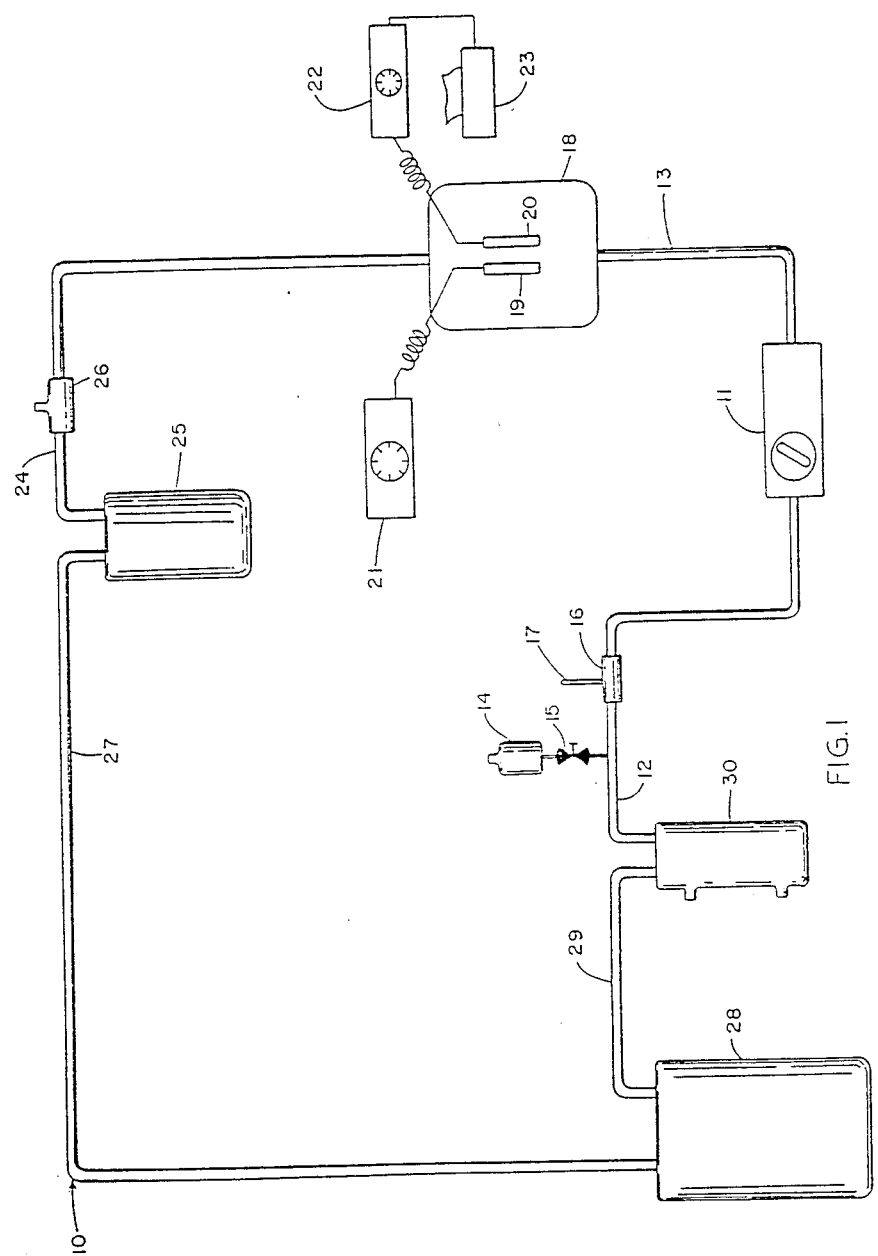
FIG. 1 is a schematic view of one apparatus used to test oxygen scavenging.

Nitrones are used in accordance with this invention to effectively scavenge oxygen from an aqueous system so that corrosion of metals in contact with the system water is inhibited. In general, the corrosion inhibiting agents used in this invention include a nitrone having the structural formula:

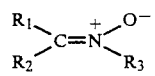

$R_1$ and $R_2$ may be the same or different and are each selected from the group consisting of hydrogen and hydrocarbon radicals having between one and ten carbon atoms. $R_3$ is a hydrocarbon radical having between one and ten carbon atoms. $R_1$, $R_2$, and $R_3$ may all be selected from alkyl groups (saturated or unsaturated), cycloalkyl groups, aryl groups, or aralkyl groups. Examples of said alkyl groups include methyl, ethyl, n-propyl, isopropyl, n-butyl, n-pentyl, n-hexyl, n-heptyl, n-octyl, n-nonyl, n-decyl, and the various n-hexenyl, n-heptenyl, n-octenyl, n-nonenyl and n-decenyl radicals. Examples of said cycloalkyl, aryl, and aralkyl groups, respectively, include cyclohexyl, phenyl, and tolyl radicals. The preferred hydrocarbon radicals are groups which have between one and seven carbons. Examples of preferred compounds are thus formaldehyde isopropylnitrone; formaldehyde ethylnitrone, formaldehyde methylnitrone, acetaldehyde isopropylnitrone, acetaldehyde propylnitrone, acetaldehyde ethylnitrone, acetaldehyde methylnitrone, acetone isopropylnitrone, acetone propylnitrone, acetone ethylnitrone, acetone methylnitrone, acetone n-butylnitrone, acetone benzylnitrone, formaldehyde n-hexylnitrone, methyl ethyl ketone ethylnitrone, formaldehyde cyclohexylnitrone, isobutyraldehyde isopropylnitrone, isobutyraldehyde ethylnitrone, n-butyraldehyde isoproylnitrone, n-butyraldehyde ethylnitrone, and n-butyraldehyde propylnitrone. These preferred compounds include formaldehyde alkyl nitrones having the general structural formula:

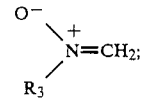

acetaldehyde alkyl nitrones having the general structural formula:

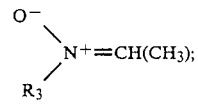

and acetone alkyl nitrones having the general structural formula:

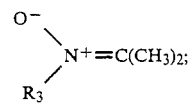

wherein $R_3$ is a saturated or unsaturated alkyl having between one and ten, and preferably between one and seven, carbon atoms. Low molecular weight embodiments of formaldehyde alkyl nitrones, acetaldehyde alkyl nitrones, and acetone alkyl nitrones such as those where $R_3$ is methyl, ethyl, propyl, or isopropyl are particularly useful where higher volatility is desired. Water soluble salts of the nitrones used in accordance with this invention may also be used.

The use of nitrones as oxygen scavengers may be practiced in various water systems, such as recirculating heating or cooling systems. We have found that they are particularly suited for use as oxygen scavenging additives to boiler related systems, such as, for example, boiler feedwater and boiler water where the water is preferably maintained at a pH between about 7 and about 12, most preferably from about 8 to about 11. One suggested use is for treatment of water in a dormant boiler wherein the nitrone may be added along with sufficient amounts of alkaline agents such as sodium hydroxide to raise the pH to within the desired range. The higher alkalinity also aids in corrosion inhibition. In boiler water systems, corrosion may occur in feed lines, heaters, economizers, boilers, steam lines, and return lines; and the invention is intended for broad use in any boiler water system (i.e. at pressures in the range of 0 to 1000 psig or higher). The volatility of nitrones included within this invention, especially those having relatively low molecular weights, also makes them useful in steam and steam condensate systems where addition may be made to either the steam or to its condensate. Oxygen scavenging is particularly effective in systems where the water reaches elevated temperatures, above say 190 degrees Fahrenheit. Indeed, inasmuch as nitrones perform effectively at higher pressures and temperatures, they are considered particularly suited for boiler water systems which operate at temperatures in the range of about 298° F. to about 637° F. and at pressures in the range of about 50 psig to 2000 psig. They are also considered effective scavengers for boiler systems which operate at even higher temperatures and pressures. The metal surfaces exposed to these conditions are generally iron and steel.

Practice of the invention will become further apparent from the following non-limiting examples.

EXAMPLE I

The oxygen scavenging activity of the chemicals was evaluated in an experimental boiler. This experimental boiler has been described previously in the proceedings of the Fifteenth Annual Water Conference, Engineers Society of Western Pennsylvania, pages 87–102 (1954).

Essentially, it consists of a vertical steel tube fitted with three external heating loops extending from near the bottom and discharging near the center of the central tube. Boiler water circulates through each heating loop from bottom to top and steam is withdrawn from the top of the vertical tube. The heating source in each loop consists of an electrical fire-rod unit transferring heat indirectly through the walls of a heating tube.

The feedwater was saturated with oxygen by continuous aeration maintaining about 8 to 9 parts per million (ppm) of dissolved oxygen. This feedwater contained a total hardness of approximately 10 ppm (as $CaCO_3$). Typical boiler water treatment chemicals such as sodium hydroxide (caustic soda) and disodium phosphate for alkalinity and calcium hardness control were added to the water in the boiler. The boiler water pH ranged from 10.8 to 11.2. Feedwater passed into the boiler where it was heated to a temperature of about 448° F. under a pressure of about 400 psig. After steam formation, the steam was condensed through a heat exchanger. The condensate, which had a temperature of approximately 55° F., was then passed through a chamber containing a standard oxygen probe. The dissolved oxygen in the condensate was measured in the chamber to determine the effectiveness of oxygen removal within the system.

Boiler water was fed through the system without addition of any oxygen scavenger until a constant dissolved oxygen reading was observed in the condensate. Once the base dissolved oxygen level in the condensate was established, formaldehyde isopropylnitrone was added as the sole oxygen scavenger to the boiler feedwater at a dosage of 80 parts per million (ppm). The dissolved oxygen level in the condensate was then monitored to determine a final level by which the effectiveness of the nitrone could be determined.

A second run was made using formaldehyde ethylnitrone in place of formaldehyde isopropylnitrone. After a base dissolved oxygen level in the condensate was established, formaldehyde ethylnitrone was added to the feedwater at a dosage of 80 ppm. The final level of the oxygen in the condensate was then measured to determine the effectiveness of the nitrone in the system.

A third run was made using hydrazine. After a base dissolved oxygen level in the condensate was established, hydrazine was added to the feedwater at a dosage of 80 ppm. The final level of oxygen in the condensate was then measured to determine the effectiveness of the hydrazine in the system.

A fourth run was made using sodium sulfite. After a base dissolved oxygen level in the condensate was established, sodium sulfite was added to the feedwater at a dosage of 80 ppm. The final level of oxygen in the condensate was then measured to determine the effectiveness of the sulfite in the system.

The results of these runs are summarized in Table I.

TABLE I

| Run No. | Oxygen Scavenger | Base Level of Dissolved Oxygen in Condensate (ppm) | Dosage of Oxygen Scavenger | | Final Level of Dissolved Oxygen in Condensate (ppm) | Reduction in Dissolved Oxygen | |
|---|---|---|---|---|---|---|---|
| | | | moles per liter | parts per million | | parts per million | percent |
| 1 | Formaldehyde Isopropylnitrone | 3.2 | .00092 | 80 | 0.3 | 2.9 | 90.6 |
| 2 | Formaldehyde Ethylnitrone | 3.6 | .0011 | 80 | 0.9 | 2.7 | 75.0 |
| 3 | Hydrazine | 2.7 | .0025 | 80 | 0.1 | 2.6 | 96.3 |
| 4 | Sodium Sulfite | 2.7 | .000635 | 80 | 0.1 | 2.6 | 96.3 |

The results shown in Table I indicate that nitrones were effective oxygen scavengers in the boiler system. It is evident that nitrones may be utilized as an oxygen scavengers in moderate and high pressure boiler systems. The iron and steel components typically found in these systems can thus be effectively protected from oxygen-related corrosion.

EXAMPLE II

The oxygen scavenging activity of nitrones were also evaluated and compared to that of hydrazine under simulated boiler feedwater conditions. The apparatus used for this evaluation is depicted schematically in FIG. 1. The apparatus (10) comprises a peristaltic pump (11) which is used for circulating water throughout the system, pump inlet tubing (12) and pump outlet tubing (13). A polyethylene fill-bottle (14) is connected with the inlet tubing (12) and is used to feed system water into the apparatus. A valve (15), which may be selectively opened and closed, is provided between the fill-bottle (14) and the inlet tubing (12) and is used to control flow therebetween. A temperature measurement chamber (16) is positioned within the pump inlet tubing (12) and contains a thermometer (17) used for monitoring the water temperature. The system water is drawn through the inlet tubing (12), into the pump (11), and then is pumped via the pump outlet tubing (13) into a glass sampling chamber (18). The sampling chamber (18) contains a pH probe (19) and a dissolved oxygen probe (20). The pH probe (19) is operably connected to a pH meter (21) used for displaying and monitoring the system water pH; and the dissolved oxygen probe (20) is operably connected to a dissolved oxygen meter (22) used for displaying and monitoring the system water dissolved oxygen level, as well as to a recorder (23) used for continuously recording the dissolved oxygen level in the system water. Tubing (24) is provided for directing system water from the glass sampling chamber (18) to the one liter stainless steel preheat reactor (25), known in the laboratory as a "Parr vessel." A glass chemical inlet chamber (26) is positioned within the tubing (24) and may be fitted with a rubber septum (not shown) through which a chemical solution of oxygen scavenger may be injected. The preheat reactor (25) contains a heating element (not shown) which may be activated to preheat the system water. Water forced out of the preheat reactor (25) by operation of the pump (11) is directed through tubing (27) to a two liter stainless steel heating reactor (28) where the system water is heated to its highest temperature. A heating element and a thermostat (not shown) are provided for maintaining the water temperature in the heating reactor (28) relatively constant. The water from the heating reactor (28) passes through tubing (29) into a water cooled heat exchanger (30) which cools the system water to a range of about 55° F. to 60° F. System water from the heat exchanger (30) is then recirculated into the pump inlet tubing (12). Thus, while the system water may be heated to elevated temperatures in the preheat reactor (25) and heating reactor (28), the recirculated water passing through the pump (11) and into the sampling chamber (18) may be kept at a relatively constant temperature conducive to accurate probe operation. The full capacity of the apparatus (10) is about 4.5 liters while the pumping rate of pump (11) is about 0.30 to 0.35 liters per minute.

The oxygen scavenging activities of nitrones and hydrazine were each investigated at system water conditions of 190° F. and pH 8.5. In each run distilled water saturate-d with oxygen (about 8 to 9 ppm) and adjusted to the requisite pH with sodium hydroxide, was fed into the system through the polyethylene fill-bottle (14). The system was filled to its capacity with water to the substantial exclusion of air, and the water was heated using the preheat reactor (25) and heating reactor (28) until the steady state was achieved at which the temperature of system water leaving the heating reactor (28), as controlled by the thermostat therein, was about 190° F., and the temperature of the system water leaving the heat exchanger (30) as measured by thermometer (17) was from about 55° F. to 60° F. During this period, gas was allowed to exit from the system through the fill-bottle (14) and the chemical inlet chamber (26); and the dissolved oxygen level in the circulating water was allowed to equilibrate. Recirculation continued in each run until the oxygen level in the system water remained constant for at least 30 minutes. Once the initial oxygen reading was established, the system was effectively closed to the atmosphere and the oxygen scavenger was injected through a rubber septum fitted in the chemical inlet chamber (26). Recycling continued for 30 minutes, during which time the oxygen level in the sampling chamber (18) was monitored. The results given in Table II below were obtained on separate runs using hydrazine (Run 12) and various dosages of the nitrones formaldehyde isopropylnitrone (Runs 5 and 6), formaldehyde ethylnitrone (Run 7), acetaldehyde isopropylnitrone (Run 8), acetaldehyde ethylnitrone (Run 9), acetone isopropylnitrone (Run 10), and acetone ethylnitrone (Run 11).

TABLE II

| Run No. | Oxygen Scavenger | Base Level of Dissolved Oxygen in Condensate (ppm) | Dosage of Oxygen Scavenger (moles per mole $O_2$) | Final Level of Dissolved Oxygen in Condensate (ppm) | Reduction in Dissolved Oxygen parts per million | percent |
|---|---|---|---|---|---|---|
| 5 | Formaldehyde Isopropylnitrone | 3.5 | 5:1 | 1.9 | 1.6 | 45.7 |
| 6 | Formaldehyde Isopropylnitrone | 3.4 | 10:1 | 1.3 | 2.1 | 61.8 |
| 7 | Formaldehyde Ethylnitrone | 3.5 | 4:1 | 1.5 | 2.0 | 57.1 |
| 8 | Acetaldehyde Isopropylnitrone | 5.2 | 4:1 | 1.2 | 4.0 | 76.9 |
| 9 | Acetaldehyde Ethylnitrone | 4.1 | 5:1 | 1.6 | 2.5 | 61.0 |
| 10 | Acetone Isopropylnitrone | 3.2 | 4:1 | 0.7 | 2.5 | 78.1 |
| 11 | Acetone Ethylnitrone | 4.5 | 4:1 | 1.5 | 3.0 | 66.7 |
| 12 | Hydrazine | 3.4 | 3:1 | 1.2 | 2.2 | 64.7 |

The results shown in Table II indicate that nitrones were effective oxygen scavengers in the system water. It is evident that nitrones may be advantageously utilized as an oxygen scavenger in feedwater systems of moderate and high temperature boilers. The iron and steel components typically found in these systems can thus be effectively protected from oxygen-related corrosion.

The process of this invention for inhibiting corrosion of metal surfaces in contact with the system water of an aqueous system by scavenging oxygen from the system water comprises adding to the system water an effective amount of at least one nitrone. The preferred dosage range of nitrone is generally from about 0.01 ppm to about 10,000 ppm. Concentrations toward the lower end of this range, say up to about 200 ppm, are most practical in systems where additional means of oxygen removal are also provided such as, for example, boiler water systems and the like having deaerators in which mechanical deaeration is practiced. Concentrations toward the upper end of this range, say about 20 ppm and above, are most practical where slug dosages are made to a system such as, for example, a recirculating hot water system, to provide residual nitrone over a long time period. The most preferred dosage range is generally from about 0.05 ppm to about 1,000 ppm. Use of nitrones is not confined to low, moderate or high pressure boiler systems, but may be utilized in a wide variety of other systems where aqueous solutions containing dissolved air and/or oxygen are in contact with metal surfaces. The precise dosage used in each system will be somewhat dependent on the specific nitrone and the particular system and the water characteristics therein. The preferred system liquid (which may contain small amounts of certain additives normally used in systems such as boiler water systems for control of corrosion, scaling, sedimentation, pH, hardness and the like) consists essentially of water containing dissolved oxygen. Likewise, where the nitrones are used to protect steam systems, the preferred steam composition (which may contain other gases normally found in air, as well as other system volatiles) consists essentially of water and oxygen. In systems where addition is made to system water which will not be further aerated before it contacts the metal surfaces to be protected, a mole ratio of nitrone to oxygen in the system is preferably between about 0.1:1 to about 1,000:1; most preferably between about 0.5:1 to about 50:1. Preferably the temperature of the system water reaches the range of about 40° F. to about 700° F. as scavenging proceeds, most preferably between about 60° F. and about 600° F.

It is generally economical, especially where the systems are not operated at elevated temperatures, that the system water have a pH greater than about 5 as oxygen scavenging proceeds; preferably between about 7 and about 12; most preferably from about 8 to about 11.

The preferred pH may be maintained by conventional means such as adding alkaline agents. Preferred conventional agents include sodium hydroxide, potassium hydroxide, sodium carbonate, potassium carbonate, and phosphate salts of high alkalinity, such as disodium phosphate, and trisodium phosphate (especially trisodium phosphate). In boiler water systems, sodium hydroxide and potassium hydroxide are generally preferred over sodium carbonate and potassium carbonate because of the known potential for carbonates to contribute to carbon dioxide induced corrosion.

The oxygen scavengers are preferably added directly to the system water as nitrones. However, compositions which, upon being added to an aqueous system, yield an oxygen scavenger consisting essentially of nitrones would of course provide similar corrosion protection and are considered within the scope of our findings.

The nitrone compositions employed in the process of this invention can typically be added to the system water by conventional bypass feeders using briquettes containing the additives, by feeding the compounds as dry powder mixtures to the water, or by feeding the treatment compounds as an aqueous feed solution. Feed solutions, when used, preferably contain from about 0.5 to about 95 percent by weight of nitrone oxygen scavenger; most preferably from about 5 to about 60 weight percent thereof. Where, as in many boiler systems, make-up water is added to the aqueous solution, calibrated injecters can be employed to deliver predetermined amounts of the nitrones, periodically or continuously, to the aqueous solution via the make-up water line. While the scavengers may be added at locations throughout the system, the addition is preferably made at a location where there is little opportunity for additional aeration of the solution before it contacts the metal components to be protected. For example, in boiler systems, addition is preferably made to the feedwater at a location where the feedwater will not be exposed to substantial aeration before it enters the boiler. Examples of such locations might include the feedwater line itself, or depending upon the boiler system design, the return condensate lines, make-up water lines, or the storage section of deaerators.

The examples describe particular embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method for inhibiting the corrosion of metals in contact with system water in an aqueous system selected from the group consisting of recirculating heating systems, recirculating cooling systems, boiler systems, steam systems, and steam condensate systems by controlling the oxygen in the system, comprising the steps of adding to the system water, in an effective amount to inhibit said corrosion, an oxygen scavenger selected from the group consisting of nitrones of the formula:

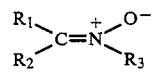

wherein $R_1$ and $R_2$ may be the same or different and are each a member selected from the group consisting of hydrogen and hydrocarbon radicals having between 1 and 10 carbon atoms, and $R_3$ is a hydrocarbon metal having between 1 and 10 carbon atoms, and of water soluble salts of said nitrones; and providing a system water pH of about 7 or more.

2. The method of claim 1 wherein $R_1$ and $R_2$ are each independently selected from a group consisting of saturated or unsaturated alkyl groups having between 1 and 7 carbons and hydrogen.

3. The method of claim 2 wherein $R_2$ is a saturated or unsaturated alkyl having between 1 and 7 carbons.

4. The method of claim 1 wherein $R_1$, $R_2$, and $R_3$ are all selected from the groups consisting of a saturated and unsaturated alkyl groups, cycloalkyl groups, aryl groups, and aralkyl groups.

5. The method of claim 1 wherein the scavenger is added to provide a dosage of between about 0.01 ppm and about 10,000 ppm thereof in the system water.

6. The method of claim 1 wherein the scavenger added is selected from the group consisting of formaldehyde alkyl nitrones, acetaldehyde alkyl nitrones, acetone alkyl nitrones, and water soluble salts thereof and wherein $R_3$ is a saturated or unsaturated alkyl having between 1 and 7 carbons.

7. The method of claim 6 wherein the scavenger is added to provide a dosage of between about 0.01 ppm and about 10,000 ppm thereof in the system water.

8. The method of claim 6 wherein $R_3$ is selected from a group consisting of methyl, ethyl, propyl, and isopropyl radicals.

9. The method of claim 1 wherein the scavenger comprises a nitrone selected from the group consisting of formaldehyde isopropylnitrone, formaldehyde ethylnitrone, acetaldehyde isopropylnitrone, acetaldehyde ethylnitrone, acetone isopropylnitrone, acetone ethylnitrone, and water soluble salts thereof.

10. The method of claim 1 wherein the system water is maintained at a pH within the range of about 7 to about 12.

11. The method of claim 10 wherein the temperature of the system water reaches the range of about 40° F. to about 700° F. as scavenging proceeds.

12. The method of claim 1 wherein addition is made to system water which will not be further aerated before it contacts the metal surfaces, and wherein the mole ratio of nitrones to oxygen dissolved in the system water is from about 0.1:1 to about 1,000:1.

13. The method of claim 1 wherein the oxygen scavenger is added in an aqueous system selected from the group consisting of boiler and steam condensate systems to protect the system metals in contact with system liquid or steam; wherein the system liquid or steam consists essentially of water and oxygen; and wherein the oxygen scavenger is added directly to the system as nitrone.

14. The method of claim 13 wherein the scavenger is added to a boiler system wherein the feed-water contains oxygen, at a location wherein there is no substantial further aeration of the water before it contacts the metal surfaces to be protected, and in a mole ratio to oxygen in the boiler feedwater of from about 0.1:1 to about 1,000:1.

15. The method of claim 14 wherein the scavenger is added in a mole ratio to oxygen in the boiler feedwater of about 0.5:1 to about 50:1.

16. The method of claim 14 wherein $R_1$ and $R_2$ are each independently selected from a group consisting of saturated and unsaturated alkyl groups having between 1 and 10 carbons and hydrogen; and wherein $R_3$ is selected from the group consisting of saturated or unsaturated alkyl having between 1 and 10 carbons.

17. The method of claim 13 wherein the scavenger comprises a nitrone selected from the group consisting of formaldehyde alkyl nitrones, acetaldehyde alkyl nitrones, acetone alkyl nitrones, and water soluble salts thereof, wherein $R_3$ is a saturated or unsaturated alkyl having between 1 and 10 carbons; and wherein the nitrone is added to provide a dosage of from about 0.01 ppm to about 10,000 ppm thereof in the system water.

18. The method of claim 17 wherein $R_3$ is selected from a group consisting of methyl, ethyl, propyl, and isopropyl radicals.

19. The method of claim 13 wherein addition is made to the feedwater of a boiler system; and wherein the feedwater is adjusted to a pH of between about 7 to about 12.

20. The method of claim 13 wherein the system contains steam and addition is made to the steam.

21. The method of claim 1 wherein the scavenger is added in an aqueous system selected from the group consisting of boiler systems operating at pressures of at least about 50 psig and temperatures of at least about 298° F. to protect the iron and steel boiler system components in contact with the boiler water, and wherein the oxygen scavenger is added to the boiler water.

22. The method of claim 21 wherein the boiler system has a deaerator and deaeration is practiced.

23. The method of claim 22 wherein the concentration of nitrone is between about 0.01 ppm and about 200 ppm.

24. The method of claim 23 wherein the scavenger is added at a location wherein there is no substantial further aeration of the water before it enters the boiler in a mole ratio to oxygen in the boiler feedwater of from about 0.1:1 to about 1,000:1.

25. The method of claim 24 wherein addition is made to the feedwater of a boiler system, and the feedwater is adjusted is a pH of between about 7 and about 12.

26. The method of claim 21 wherein the scavenger is added to provide a dosage of between about 0.01 ppm to about 10,000 ppm thereof in the boiler water.

27. The method of claim 26 wherein the scavenger comprises a nitrone selected from the group consisting of formaldehyde alkyl nitrones, acetaldehyde alkyl nitrones, acetone alkyl nitrones, and water soluble salts thereof, and wherein $R_3$ is a saturated or unsaturated alkyl having between 1 and 10 carbons.

28. The method of claim 27 wherein $R_3$ is selected from a group consisting of methyl, ethyl, propyl and isopropyl radicals; and wherein the pH of the system is maintained between about 7 and about 12.

29. The method of claim 29 wherein the mole ratio of nitrone to oxygen provided to the boiler water system is between about 0.5:1 and about 50:1; the boiler water pH is maintained at a pH of between about 7 and 12; and the dosage of nitrone provided to the boiler water is between about 0.05 ppm and 1,000 ppm.

30. The method of claim 26 wherein the boiler system reaches operating pressures between about 50 psig and about 2000 psig and operating temperatures between about 298° F. and about 637° F. as scavenging proceeds.

31. The method of claim 26 wherein the boiler water is maintained at a pH of between about 7 and 12; and wherein the scavenger comprises a nitrone selected from the group consisting of formaldehyde isopropylnitrone, formaldehyde ethylnitrone, acetaldehyde isopropylnitrone, acetaldehyde ethylnitrone, acetone isopropylnitrone, acetone ethylnitrone, and water soluble salts thereof.

32. The method of claim 31 wherein the mole ratio of nitrone to oxygen provided to the boiler water system is between about 0.1:1 and about 1,000:1; and the dosage of nitrone provided to the boiler water is between about 0.05 ppm and 1,000 ppm.

* * * * *